Figures 8, 9:
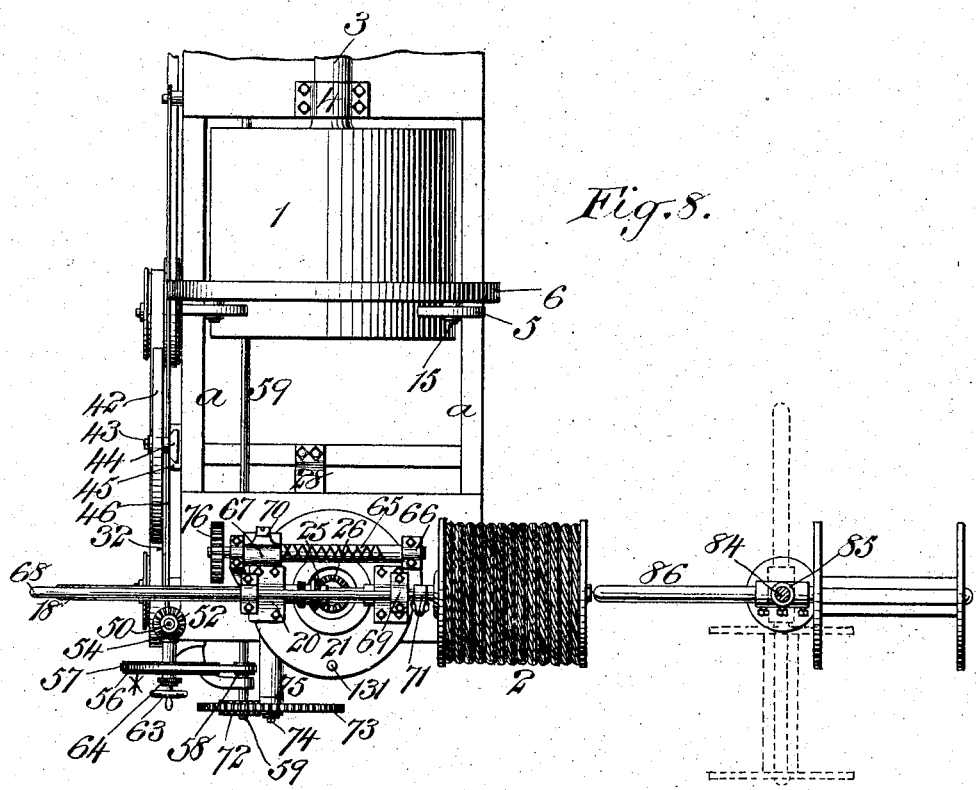

No. 781,280. PATENTED JAN. 31, 1905.
J. GOOD.
MACHINERY FOR THE PREPARATION OF VEGETABLE FIBERS FOR SPINNING.
APPLICATION FILED FEB. 26, 1903. RENEWED JULY 19, 1904.
5 SHEETS—SHEET 1.
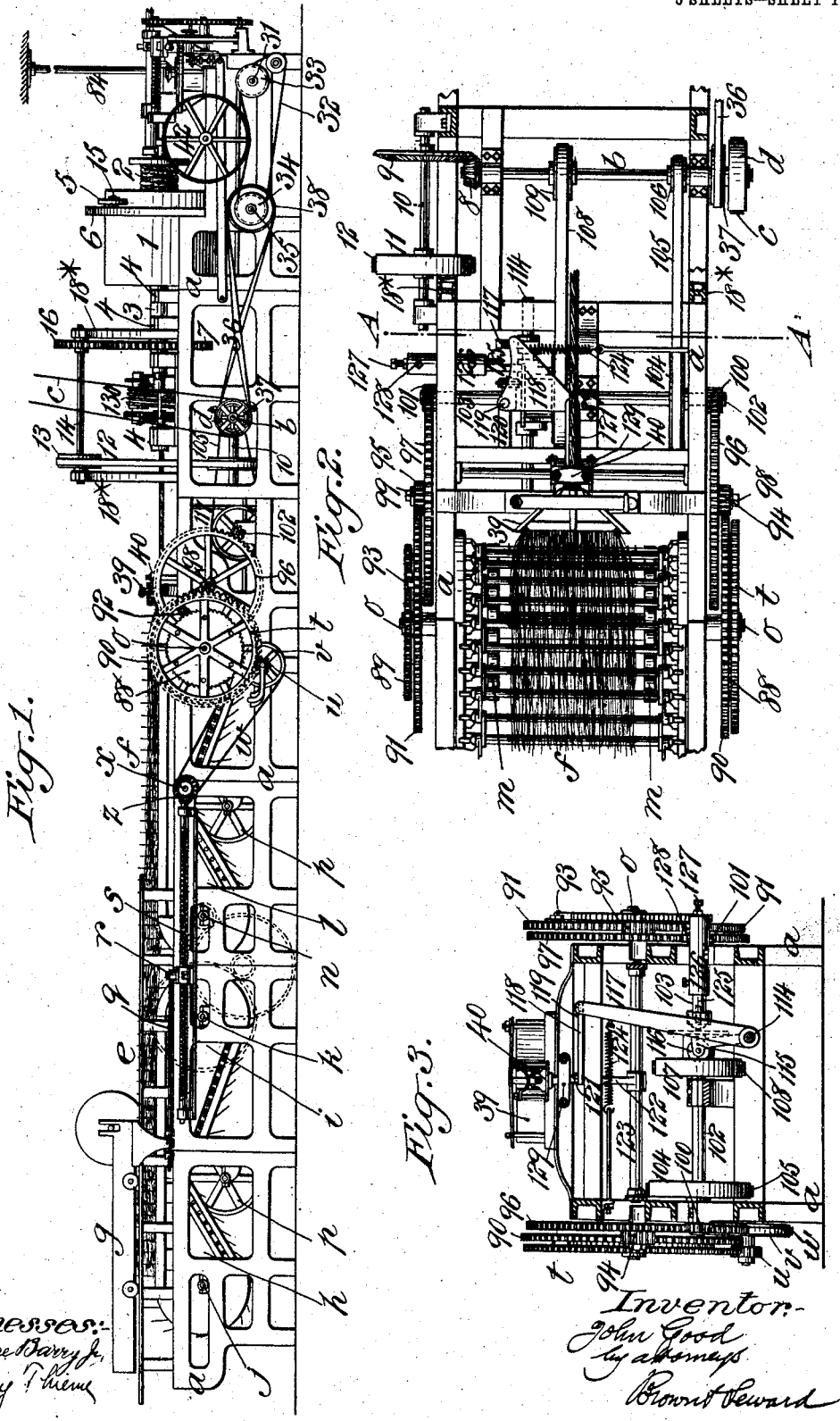
Witnesses:
George Barry Jr.
Henry Thieme
Inventor:
John Good
by attorneys
Brown & Seward

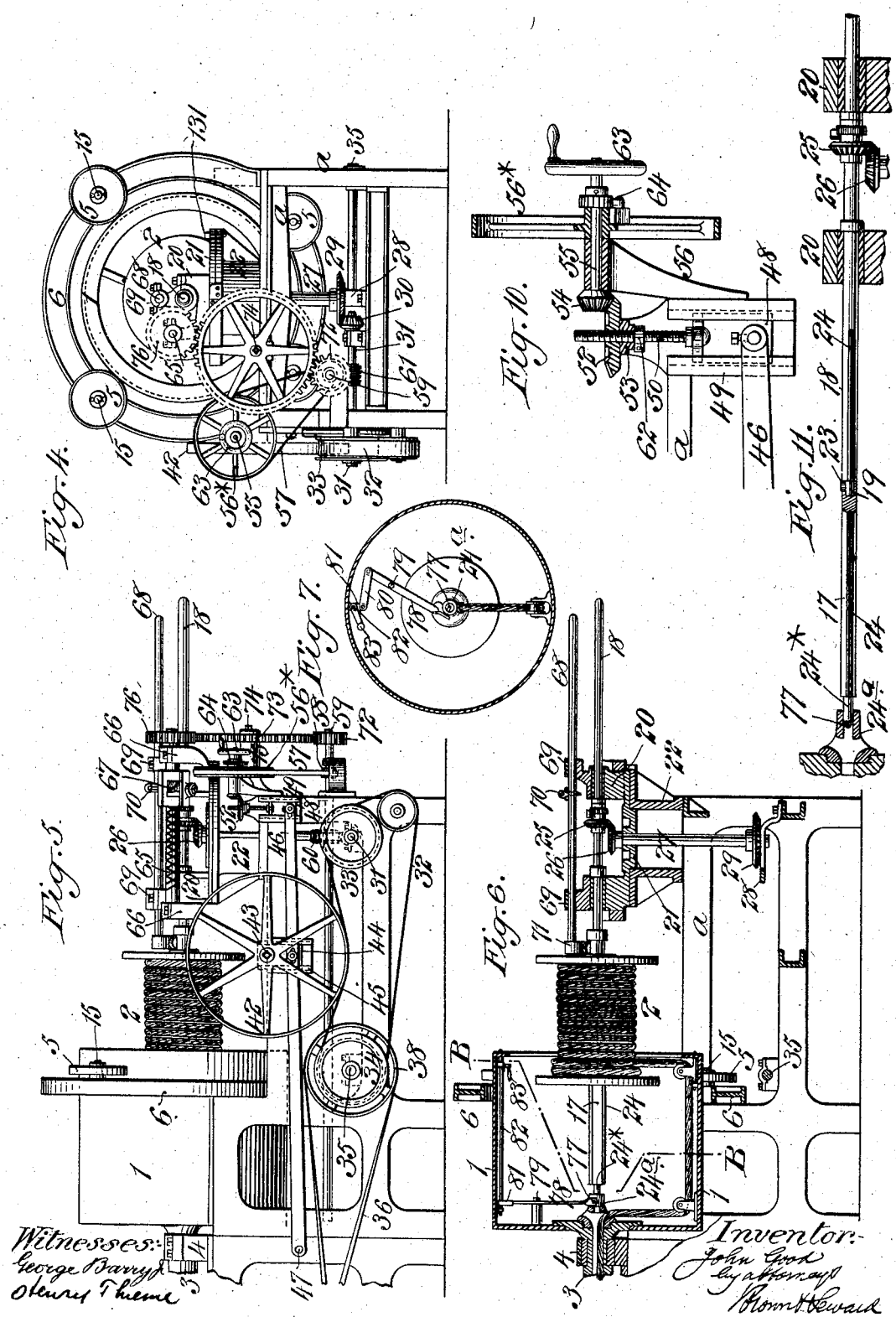

No. 781,280. PATENTED JAN. 31, 1905.
J. GOOD.
MACHINERY FOR THE PREPARATION OF VEGETABLE FIBERS FOR SPINNING.
APPLICATION FILED FEB. 26, 1903. RENEWED JULY 19, 1904.

5 SHEETS—SHEET 3.

Witnesses:—
George Barry Jr.
Henry Thieme

Inventor:
John Good
by Attorneys
Brown & Seward

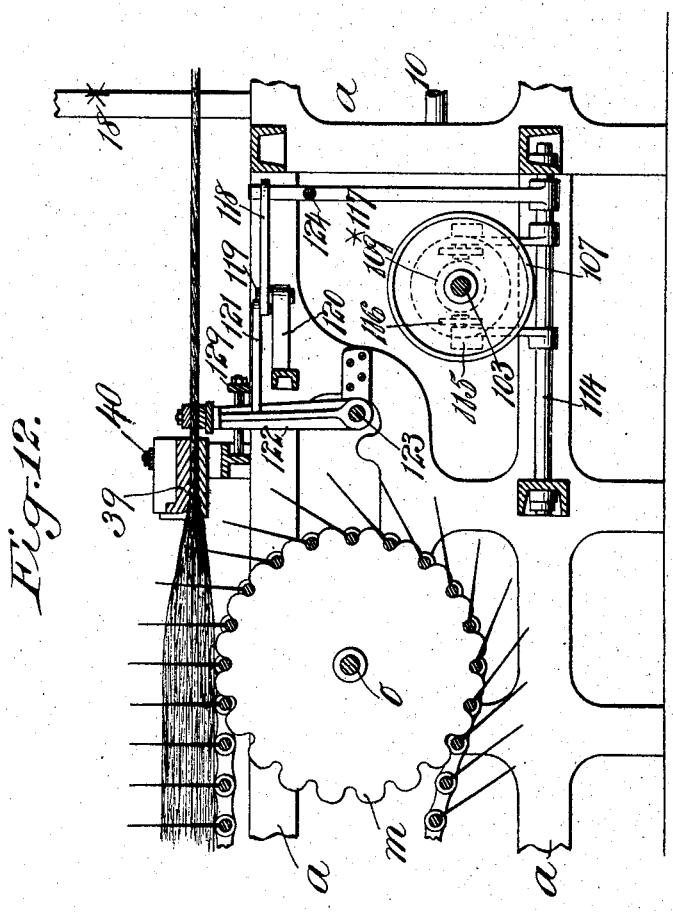

No. 781,280. PATENTED JAN. 31, 1905.
J. GOOD.
MACHINERY FOR THE PREPARATION OF VEGETABLE FIBERS FOR SPINNING.
APPLICATION FILED FEB. 26, 1903. RENEWED JULY 19, 1904.
5 SHEETS—SHEET 5.
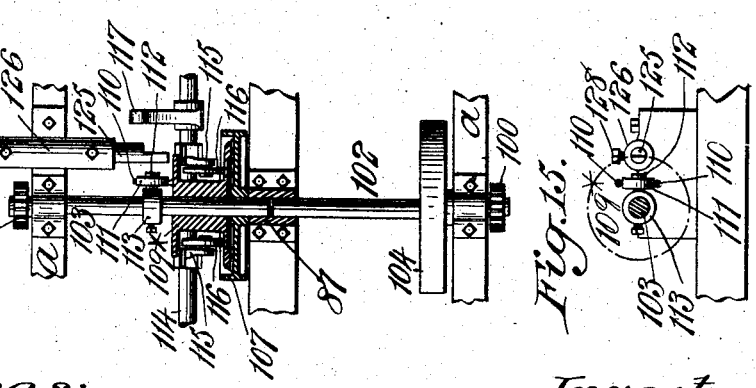
Witnesses:
George Barry Jr
Henry Thieme
Inventor:
John Good
By Attorneys
Brown & Seward No. 781,280.      Patented January 31, 1905.

UNITED STATES PATENT OFFICE.

JOHN GOOD, OF FAR ROCKAWAY, NEW YORK, ASSIGNOR, BY DIRECT AND MESNE ASSIGNMENTS, TO THE JOHN GOOD CORDAGE CO., A CORPORATION OF NEW YORK.

MACHINERY FOR THE PREPARATION OF VEGETABLE FIBERS FOR SPINNING.

SPECIFICATION forming part of Letters Patent No. 781,280, dated January 31, 1905.

Application filed February 26, 1903. Renewed July 19, 1904. Serial No. 217,157.

*To all whom it may concern:*

Be it known that I, JOHN GOOD, a citizen of the United States, and a resident of Far Rockaway, in the borough of Queens, in the city and State of New York, have invented a new and useful Improvement in Machinery for the Preparation of Vegetable Fibers for the Market or for Spinning, of which the following is a specification.

This invention has for its object the preparation of vegetable fibers of considerable length, such as are known as "sisal hemp" and "manila hemp" and used for the manufacture of twine and cordage. Such fibers have heretofore commonly been transported to the market or place of manufacture in bales containing them in bunches, which are packed together in such comparatively loose condition as to render the bales very bulky in proportion to their weight. By the machinery which is the subject of the present invention the fibers are so prepared and baled that bales of given weight are less bulky, and consequently can be transported at less expense. The bale is composed of a continuous slightly-twisted roving, which is tightly coiled into a compact body, which body is to be bound with ties or bands and may or may not be enveloped with a protecting material, as canvas. The fibers baled in this way may be made to occupy, weight for weight, about or little more than half the space occupied by the bales filled and packed in the way heretofore practiced, and, moreover, in their subsequent manufacture into twine and cordage less waste is incurred.

A complete machine embodying the whole of my invention includes, first, mechanism for hackling or combing the fibers and spreading or distributing them lengthwise with their ends systematically lapping one another; second, mechanism for collecting the so-spread fibers into a sliver and for giving the said sliver a sufficient twist to form it into a roving in which the fibers will be self-retained in desirable relation to each other for transportation and at the same time forming the said sliver into a compact coil; third, automatic regulating devices between the said mechanisms whereby a proper relative speed may be maintained between said hackling, combing, or spreading mechanism and said twisting and coiling mechanism to obtain a roving of uniform bulk or thickness, and, fourth, means for facilitating the removal of the coiled roving from the machine.

Figure 1 of the accompanying drawings represents a side elevation of the complete machine; Fig. 2, a plan view showing the main shaft of the machine, parts of the hackling, combing, or spreading mechanism and its driving-gear, parts of the driving-gear for the twisting and coiling mechanism, and showing also the automatic regulating devices; Fig. 3, a transverse vertical section in the line of Fig. 2. Figs. 4, 5, and 6 represent, respectively, an end elevation, a side elevation, and a central longitudinal section of the twisting and coiling mechanism which appears at the right-hand end of Fig. 1; Fig. 7, a transverse vertical section in the line of Fig. 6. Fig. 8 is a plan of the twisting and coiling mechanism, showing its parts in a position different from that shown in Figs. 4, 5, and 6 and showing also the provision for the removal of the coil; Fig. 9, an end elevation corresponding with Fig. 8. Fig. 10 is a detail view, to be hereinafter explained, of a belt-tension-controlling device forming part of the twisting and coiling mechanism. Fig. 11 is a horizontal view, partly in section, of a spindle upon which the coiling is performed. Fig. 12 represents a longitudinal vertical sectional view including parts of the automatic regulating devices hereinbefore mentioned; Figs. 13, 14, 15, detail views, to be hereinafter explained, of parts of the said automatic regulating devices. Figs. 2 to 9 are on a scale larger than Fig. 1. Figs. 10 to 15 are on a still larger scale.

Similar letters and numbers of reference designate corresponding parts in all the figures.

*a a* designate the framing of the machine; *b*, the main shaft, arranged transversely in said framing and represented (see Figs. 1 and 2) as deriving motion through a belt *c* and pulley *d* for driving all parts of the machine.

*e* and *f* are two endless pin-trains consisting of chains, bars, and gill-pins arranged one in advance of the other for performing the combing, hackling, or spreading of the fibers which are supplied to the first train from a reciprocating feed-carriage $g$. The train $e$ is carried by wheels $h\ i$ on shafts $j\ k$, and the train $f$ is carried by wheels $l\ m$ on shafts $n\ o$, said shafts being supported in bearings on the framing $a\ a$ and the lower parts of the chains of the trains being held from sagging by idler-wheels $p$, supported on the framing. The two trains are substantially like those common in spreading-machines and may be driven in any suitable manner so that the second train $f$ runs considerably faster than the first train $e$. The train $f$ is driven by its shaft $o$, as will be hereinafter described, and the train $e$ is driven from the train $f$ by gearing between the shafts of the two trains in a manner well known in machinery of the kind. The reciprocating feed-carriage shown in Fig. 1 is fully described in and claimed as part of the subject-matter of my United States Letters Patents No. 608,979 and No. 608,980 and is driven in the same manner by a connection $q$ with a switch-nut $r$ on cross-threaded traverse-screws $s$ on one side of the framing. It is not necessary to describe particularly the means for driving this traverse-screw, as it may be driven in any suitable manner from the driving-shaft $o$ of the pin-trains; but it is represented in Fig. 1 as driven by a gear $t$ on said shaft $o$ through a smaller gear $u$ and a pulley $v$, which run together on a stud affixed to the framing, said gear $u$ engaging with and deriving motion from said gear $t$ and the said pulley $v$ transmitting motion, through a belt $w$, to a pulley on a stud $x$ and the said pulley transmitting motion through bevel-gears $z$ to the traverse-screw.

Before describing the driving mechanism through which the driving-shaft $o$ of the pin-train derives motion at a properly-regulated speed from the main shaft $b$ of the machine I will describe the mechanism for twisting the sliver into the roving and for coiling the said roving for baling. The principal parts of this twisting and coiling mechanism are a flier 1 and a bobbin 2. (See Figs. 1, 4, 5, 6, 7.) The flier, which is open at one end, has at the other end a long journal 3, which runs in fixed bearings 4 on the framing and is furnished with a capstan 130, which may be such as is common to the fliers of twisting-machines. The body or sides of this flier are represented of cylindrical form and as supported by four antifriction-rollers 5, which turn on fixed studs 15, carried by a circular frame or arch 6, erected across the framing $a\ a$. This flier is driven at a proper speed from the main shaft $b$ of the machine through a spur-gear 7, fast on its journal 3. A bevel-gear 8 on said shaft $b$ gears with and drives a larger bevel-gear 9, fast on a shaft 10, arranged in bearings outside of the framing $a$, and the said shaft 10 is furnished with a pulley 11, which receives and drives a belt 12, running on a pulley 13 on a shaft 14, which works in bearings in standards 18*, erected across the framing $a\ a$. This shaft 14 carries a spur-gear 16, which engages with and drives the spur-gear 7 on the flier.

The bobbin 2 is carried by a spindle 17 18, which is concentric with the flier. This spindle is made or divided in two lengths, which are united by a socket 19, formed on the outer end of the part 17, which is nearly all contained in the flier, and receiving the inner end of the part 18, which part is of very considerable length and turns in bearings 20 20 on a turn-table 21, which turns on a stand 22, erected on the framing $a$. To provide for the turning of the two lengths or parts 17 18 of the spindle together, the part 18 is furnished (see Fig. 11) with a short tongue 23, which enters a slot in the end of the socket 19, said socket and tongue thus forming a coupling. The said parts 17 18 of the bobbin-spindle are each provided with one of two portions of a longitudinal feather 24, which two portions are in line with each other when the tongue 23 is in engagement with the socket 19, so that both of said portions engage with a groove in the bore of the bobbin 2 for the purpose of turning the latter, and the bobbin may slide lengthwise from one to the other of said parts of the spindle. The part 17 of the spindle is provided at its inner end with a long journal 24*, (see Fig. 11,) which is fitted to turn in a bearing 24$^a$ in the head of the flier and also to slide lengthwise, as and for the purpose hereinafter described, in said bearing. For the purpose of rotating the bobbin-spindle at a lower velocity relatively to the flier, in the same direction therewith, the part 18 is furnished with a bevel-gear 25, which derives motion from a bevel-gear 26 on an upright shaft 27, arranged in the center of the turn-table 21, the said shaft having an upper bearing in the turn-table and a lower bearing in a bracket 28 on the framing. This shaft 27 receives rotary motion through bevel-gears 29 30 from a horizontal shaft 31, working in bearings on the framing $a$, the said shaft 31 receiving motion through a belt 32, running to a pulley 33 thereon from a pulley 34 on a shaft 35, which runs in fixed bearings on the framing $a\ a$, the said belt being represented (see Fig. 5) as also running on an idler-pulley. This shaft 35 derives motion from the main shaft $b$ through a belt 36, running from a pulley 37 on said shaft $b$ to a pulley 38 on said shaft 35.

Between the flier and the pin-train $f$ there is arranged a conductor 39 for gathering into a sliver the lap of fibers which is received from said train after the hackling, spreading, or drawing operation performed by and between the pins of the two trains $e\ f$, and between the said conductor and the flier is a nipper 40, which forms a part of the automatic speed-regulating devices to be hereinafter described and through which the said sliver passes to the flier to be thereby twisted into the loose roving, and thereby wound upon the bobbin to form the coil, which after its removal from the bobbin is to constitute the bale or the body thereof.

The tension of the belt 32, even at its slackest, is always sufficient to transmit the small amount of power required for driving the bobbin-spindle; but the said belt also serves as a means of producing friction on the pulley 33 for the purpose of counteracting in a proper degree the tendency of the flier to pull the bobbin round with it, such counteraction preserving the requisite tension of the portion of the roving which is passing from the flier to the bobbin. The said friction requires to be increased as the diameter of the coil of roving on the bobbin increases, and this increase I obtain by increasing the tension of the belt, and for this purpose I employ the devices which I will now describe with reference to Figs. 4, 5, 7, and 10. Above and bearing on the upper run of said belt 32 there is a large idler-pulley 42, which turns on a pin 43 in an upright slide 44, which works in a fixed upright guide 45 and which is carried by a lever 46, fulcrumed at one end by a pin 47 to the framing. The other end of said lever is connected with a slide 48, which works in a fixed vertical guide 49 on the framing. To this slide a screw 50 (see Fig. 10) is connected in such manner that it cannot turn, and fitted to this screw is a nut 52, the exterior of which is toothed to form a bevel-gear, which rests upon the head 53 of the guide 49, the screw passing freely through said head and the nut 52 being held down to the said head 53 by any suitable means, such means in the example shown being the bevel-gear 54 on the short shaft 55, which runs in a fixed bearing in a bracket 56, secured to the framing *a a*. The turning of the said shaft 55 and its bevel-gear 54 in one direction or the other causes the turning of the nut 52 in a direction to raise or lower the screw 50, the slide 48, and the corresponding end of the lever 46, and so to raise or lower the pulley 42 and increase or diminish its pressure on the belt 32 and the tension of the latter, so that it may slip more or less, as required, to preserve a proper tension of the roving between the bobbin and the flier. For the purpose of automatically turning the shaft 55 it is furnished with a pulley 56*, which receives a belt 57 from a pulley 58 on a shaft 59, which runs in fixed bearings on the main framing and which is also furnished with a worm-gear 60, through which it derives motion from an endless screw 61 on the shaft 31, hereinbefore described. At the commencement of the winding of the roving upon the bobbin, when the draft of the roving between the flier and the small coil on the bobbin is least effective in pulling the bobbin forward with the flier and the counteracting friction of the belt 32 is least required, the screw 50 and the slide 48, the lever 46, and the pulley 42 are in the highest position and the belt is slackest; but as the winding of the roving on the bobbin proceeds the nut 52, receiving rotary motion from the shaft 31 through the endless screw 61, worm-gear 60, pulley 58, belt 57, pulley 56*, shaft 55, and bevel-gear 54, causes the depression of the screw 50, slide 48, lever 46, and pulley 42, and so increases the tension of the driving-belt to meet the requirements, reducing at the same time the speed of the flier. For the purpose of limiting the upward movement of the screw 50 and the minimum pressure of the belt at the commencement of winding on the bobbin an adjustable stop-collar 62 is clamped to the screw 50 below the head 53 of the guide 49, the said head constituting a stop to stop the screw at the proper height. For the purpose of turning back the nut 52 and raising the screw 50 to its starting position the shaft 55 is furnished with a hand-wheel 63, and the engagement of the pulley 56 with said shaft is made by a ratchet-wheel and pawl 64, through which the said shaft is driven only in the direction for depressing the screw.

A traverse-screw 65, such as is commonly employed for producing the traverse of the bobbin within the flier in certain classes of spinning machinery, has its journals fitted to turn in bearings 66 on the turn-table 22. The switch-nut 67, working on this screw, is connected with the outer head of the bobbin by a rod 68, which is parallel with the bobbin-spindle and slides through guides 69 on the turn-table. The connection 70 between this rod and the switch-nut may be of any detachable kind, and the connection between said rod and the bobbin is made in any suitable detachable manner—as, for instance, in the example represented, by means of an arm 71, carried by the said rod 68 and engaging with the outer head of the bobbin. The traverse-screw 65 is driven from the shaft 59, before described, by a small spur-gear 72 on the said shaft, which engages with and drives a larger spur-gear 73, turning on a fixed stud 74, carried by a bracket 75 on the end of the framing *a a*, the said gear 73 engaging with and driving a spur-gear 76 on the traverse-screw.

The object of the turn-table 22, which carries the driving length 18 of the bobbin-spindle and most of the appurtenances of said spindle and bobbin, is to facilitate the removal from the machinery of a full bobbin and its replacement by an empty one, for which purpose the turn-table is turned, as shown in Figs. 8 and 9, to the extent of a quarter-revolution from the position represented in Figs. 1, 4, 5, 6, which it occupies during the twisting and winding operation. This turning, it is obvious, cannot be done until the bobbin is withdrawn entirely from the flier, and in order to permit it to be done the length 18 of the spindle, which is on the turn-table, and the length 17, which remains in the flier, must be uncoupled at 19 23. To provide for this uncoupling, the journal 24* on the length 17 of the spindle (see Figs. 6 and 11) is made long enough to slide in its bearing 24$^a$ in the flier-head far enough to permit the slot in the end of the socket 19 to engage with and be disengaged from the coupling-tongue 23 on the length 18 of the spindle, which is so fitted to its bearing 20 on the turn-table as to be incapable of longitudinal movement. When the spindle length 17 occupies the position of engagement shown in Fig. 7 with the length 18, it is locked in such engagement by a stop-pin 77, which is inserted through the bearing 24$^a$ in the flier-head behind the inner end of the journal 24; but when it is desired to disengage the two lengths of the spindle the pin 77 is withdrawn from behind the journal and the spindle length is pushed back in the flier by hand or any suitable means far enough to uncouple the coupling 19 23. As, owing to the length of the flier, it would be difficult to withdraw and reinsert the stop-pin 77 by hand, I provide for this purpose the devices shown in Figs. 6 and 7, wherein the stop-pin is shown attached to one end of a lever 78, which works on a fulcrum-pin 79 on the flier-head, and the other end of which is connected by a link 80 with one arm 81 of a small rocking spindle 82, arranged in or on the interior of the flier. The front end of this spindle 82 carries a handle 83, by which it may be turned to operate the stop-pin 77.

To provide for the quick removal of the full bobbin from the spindle length 18 when the turn-table and bobbin have been turned to the position shown in Figs. 8 and 9, I provide, as shown in said figures, on one side of the turn-table, at a suitable distance therefrom, a stationary column 84, upon which there is fitted a rotatable head 85, from which project in opposite directions two opposite spindles 86, which are on a level with the spindle 17 18. A spare bobbin is kept on one of the said spindles 86, as shown in Figs. 8 and 9. When the bobbin is turned aside with the turn-table to the position shown in those figures, the empty spindle 86 is turned to a position in line with the spindle length 18, as shown, and the bobbin is drawn off the said spindle length and onto the said spindle 86. The two spindles 86 are turned to change places and the empty bobbin is drawn lengthwise onto the spindle length 18 from the spindle 86 which is opposite to it. The full bobbin is then at a convenient time removed from the other spindle 86 to be replaced by an empty one.

To provide for the easy turning of the turn-table by hand, the spindle 18 and the rod 68 are prolonged beyond their bearings on the turn-table to serve as hand-levers. To lock the turn-table either with the bobbin-spindle member 18 in line with the axis of the flier or with the said spindle member turned toward the spindle-column 84, a movable locking-pin 131 is inserted through a hole in the turn-table and one or other of two suitably-arranged holes in the top of the stand 22.

I will now proceed to describe the driving and automatic speed-regulating mechanism through which motion is transmitted from the main shaft $b$ to the driving-shaft $o$ of the pin-trains at a speed which is so regulated that the pin-trains supply a sliver of sufficient volume to give a roving of uniform bulk or thickness. The said shaft $o$ has, as shown in Fig. 14, keyed fast upon it at one end the spur-gear $t$, hereinbefore mentioned, which carries a ratchet-wheel 88, and it has keyed fast upon it near the other end a ratchet-wheel 89. The said shaft has also loose upon it spur-gears 90 and 91. The gear 90 carries a pawl 92, engaging with the ratchet-wheel 88. The gear 91 carries a pawl 93, which engages with the ratchet-wheel 89. The gears 90 91 gear, respectively, with pinions 94 95, which are carried by gears 96 97, running on two studs 98 99, affixed to opposite sides of the framing $a$. These gears 96 97 gear, respectively, with pinions 100 101, which are each carried by one of two shafts 102 103, which are arranged in line with each other, as shown in Figs. 2, 3, and 13, in bearings on the framing $a$ $a$. The shaft 102 has fast upon it a pulley 104, which receives a driving-belt 105 from a pulley 106, fast on the main shaft $b$, and the said shaft 103 has loose upon it a pulley 107, smaller than 104, which is coupled with and uncoupled from it, as hereinafter described. This pulley 107 receives a driving-belt 108 from a pulley 109, larger than 106, fast on the main shaft $b$. The belts 105 and 108 respectively drive the pulleys 104 107, which drive the shafts 102 103, whose pinions 100 101 drive the gears 96 97, whose pinions 94 95, respectively, drive the loose gears 90 91 on the pin-train driving-shaft $o$. The pulley 104 thus drives the gear 90 and the pulley 107 thus drives the gear 91; but 107, by reason of its being smaller than 104 and of its being driven from the larger one, 109, of the two pulleys 106 109 on the main shaft drives its respective gear 91 faster than the pulley 104 drives its respective gear 90; but the slower driving-pulley 104 being fast on the shaft 102 is always driving the gear 90, while the faster pulley 107 being loose on its shaft 103 only drives when coupled therewith. The necessary coupling and uncoupling of this pulley with and from its shaft 103 is effected under the control of the nipper 40 through a flanged friction-hub 109*, which is fitted loosely to said shaft and which for the purpose of turning said shaft carries two laterally-projecting pins 110 110, which receive between them an antifriction-roller 111, carried by a pin 112, radially projecting from a collar 113, which is fast on said shaft. The relation between the pins 110 and the roller 111 is shown in Fig. 15, which represents a transverse section of the shaft 103 taken immediately behind the hub 109*. The contiguous faces of the said hub and of the pulley 107 constitute friction-surfaces through which the pulley 107 is coupled to the hub 109* and thence through the pins 110 110 and the roller 111 with the shaft. The movement of the hub 109* toward and from the pulley 107 for coupling and uncoupling is effected through a rocking lever, the fulcrum of which is a rock-shaft 114, arranged below and at right angles to the shafts 102 103 in fixed bearings on the framing, the said lever having two arms 115, which project upward, as shown in Fig. 13, on opposite sides of the shaft 103 and which carry antifriction-rollers 116, which work between the flanges on the ends of the hub 109*. A third and longer arm 117 of the said lever projects upward against the edge of one arm or side of an elbow-lever or bell-crank 118, which works horizontally upon a fixed fulcrum 119 in a stationary bracket 120 (see Fig. 2) on the framing, the other side or arm of said elbow-lever or bell-crank being connected by a link 121 with the arm 122, which carries the nipper 40. This arm is carried by a rock-shaft 123, which works in fixed bearings on the framing. A spring 124 holds the arm 117 to the elbow-lever 116 and acting through said lever on the nipper-carrying arm 122 tends to hold back the nipper in opposition to the drag of the sliver passing through it. In front of the arm 122 there is a fixed but adjustable stop 129 to restrict the forward movement of the nipper to what is necessary. Opposite the back of the loose hub 109* there is arranged a stationary but adjustable brake for arresting the movement of the shaft 103 when said hub and said shaft are uncoupled from the loose pulley 107. This brake consists of a bar 125, which is held in proper endwise relation to said hub in a stock 126, fastened to the framing $a$. This brake-bar is adjusted endwise by a screw 127 in the back of the stock 126 and secured in proper adjustment by set-screws 128 in said stock.

While the fiber supplied by the pin-trains $e$ and $f$ is in sufficient quantity to give a sliver of proper bulk, the friction of the sliver in the nipper 40, acting through the elbow-lever 118 on the lever-arm 117, overcomes the tension of the spring 124 sufficiently to permit the elbow-lever to press aside the said arm 117 sufficiently to so hold back the arms 115 and rollers 116 that the coupling-hub 109* on the shaft 103 will be free from the pulley 107 and no driving of said shaft takes place, the said pulley turning loosely on its shaft. The train-driving shaft $o$ is then driven by the slower gear 90, which derives motion, as hereinbefore described, from the pulley 104 and transmits motion to the shaft through the engagement of its pawl 92 with the ratchet-wheel 88, which is permanently fastened to the shaft, as hereinbefore described. As soon, however, as any perceptible diminution in the bulk of the sliver takes place and the tension of the spring prevails over the draft of the sliver on the nipper the latter falls back far enough, followed by the elbow-lever 118, to permit said spring by its action on the lever 117 116 to force the coupling-hub 109* into frictional contact with the pulley 107, which being driven from the main shaft $b$ through the pulley 109 and belt 108 and being prevented from moving lengthwise on the shaft 103 by coming in contact with the shaft-bearing 87 (see Fig. 13) drives the said hub and the shaft 103 through such frictional contact. The pinion 101 then, as hereinbefore explained, drives the loose gear 91 on the shaft $o$. This gear 91 by its detached pawl 93 drives the ratchet-wheel 89, which being fast on the shaft $o$ drives the said shaft faster relatively to the flier than it had been driven through the pulley 104, gear 90, and their intermediate shafts and gearing, and so increases the supply of fiber and the bulk of the sliver to be twisted. While the shaft $o$ is thus driven at the increased speed, the ratchet-wheel 88 passes by the pawl 92, carried by the slower-moving loose gear 99. On the other hand, while the faster-moving pulley 107 is uncoupled and the slower-moving pulley 104 is driving the teeth of the ratchet-wheel 89, which is turning with the shaft $o$, pass by the pawl 93, carried by the loose gear 91, which remains stationary and is so held by the contact of the coupling-hub with the stationary brake-bar 125, the said hub being pressed back against said brake-bar by the draft of the fiber in the nipper when said draft is sufficient to overcome the tension of the spring 124, and so produce, through the nipper-arm 122, bell-crank 118, and lever 117 116, the proper throwing back of the coupling-hub from the pulley 107. In the operation the unavoidable tendency to slight variation in the bulk of the sliver causes the nipper to constantly vibrate back and forth and by its action to produce constant or frequently-repeated change of driving from the slower to the faster of the pulleys 104 107, and vice versa.

What I claim as my invention is—

1. The combination with a flier open at one end and bearings therefor, of a bobbin, a spindle upon which the bobbin is capable of sliding lengthwise into and from the flier, a turn-table opposite the open end of the flier, and bearings in the flier and on the turn-table respectively for the support of the spindle both in the flier and on the turn-table during the rotation of the flier, substantially as and for the purpose herein described.

2. The combination with a flier open at one end and bearings therefor, of a bobbin, a spindle composed of two separable lengths upon which the bobbin is capable of sliding lengthwise within the flier, means for coupling and uncoupling the said lengths of spindle, a bearing within the flier for one of said lengths, a turn-table opposite the open end of the flier, and bearings on said turn-table for the other of said lengths, substantially as and for the purpose herein described.

3. The combination with a flier open at one end and bearings therefor, of a bobbin, a spindle composed of two separable lengths on which the bobbin is capable of sliding lengthwise from one to the other within the flier, a turn-table opposite the open end of the flier, bearings on the turn-table for one of said lengths of spindle, a bearing within the flier in which the other length of spindle is movable lengthwise, a longitudinally-separable coupling between said lengths, and a movable stop-pin in the latter bearing for locking said coupling in engagement, substantially as herein described.

4. The combination with a flier open at one end and bearings therefor, of a bobbin, a spindle composed of two separable lengths on which the bobbin is capable of sliding lengthwise from one to the other within the flier, a turn-table opposite the open end of the flier, bearings on the turn-table for one of said lengths of spindle, a bearing within the flier in which the other length of spindle is movable lengthwise, a longitudinally-separable coupling between said lengths, a movable stop-pin in the latter bearing for locking said coupling in engagement, a lever on the flier-head carrying said pin, a rocking spindle and bearings therefor within and on one side of the flier, a connection between said rocking spindle and lever, and means for turning said rocking spindle by hand, substantially as herein described.

5. The combination with a flier open at one end, of a bobbin having a groove lengthwise of its bore, a spindle composed of two separable lengths each of which has a longitudinal feather and from one to the other of which the bobbin is capable of moving lengthwise, a coupling between said spindle lengths which maintains the two feathers in line with each other, a turn-table and bearings thereon for one of said spindle lengths and a bearing in the flier for the other of said spindle lengths, substantially as herein described.

6. The combination with a flier open at one end and bearings therefor, of a bobbin, a spindle composed of two separable lengths upon which the bobbin is capable of sliding lengthwise within the flier, means for coupling and uncoupling the said lengths of spindle, a bearing within the flier for one of said lengths, a turn-table opposite the open end of the flier, a traverse-screw and connections between said screw and the bobbin, bearings on said turn-table for the other length of the spindle and for the traverse-screw, and means for driving said flier, spindle and traverse-screw, substantially as herein described.

7. The combination with a flier open at one end, of a bobbin, a spindle upon which the bobbin is capable of sliding lengthwise within the flier, a turn-table and bearings thereon for said spindle, and driving mechanism for said spindle comprising a shaft arranged centrally within the turn-table, means for driving said shaft, and bevel-gearing between said shaft and spindle, substantially as herein described.

8. The combination with a horizontal turn-table, a horizontal bobbin-spindle member and bearings for said spindle member on said turn-table, of an upright shaft having a bearing in the center of the turn-table, a fixed bearing for said shaft below the turn-table, a bevel-gear on said shaft and a corresponding bevel-gear on said spindle, a horizontal shaft and fixed bearings therefor, meshing bevel-gears on said horizontal and upright shafts respectively, a pulley on said horizontal shaft, a driving-pulley, and a belt running on both said pulleys, substantially as herein described.

9. The combination with a horizontal turn-table, a horizontal bobbin-spindle member and bearings for said spindle member on said turn-table, of an upright shaft having a bearing in the center of the turn-table, a fixed bearing for said shaft below the turn-table, a bevel-gear on said shaft and a corresponding bevel-gear on said spindle, a horizontal shaft and fixed bearings therefor, meshing bevel-gears on said horizontal and upright shafts respectively, a pulley on said horizontal shaft, a driving-pulley, a belt running on both said pulleys, an idler-pulley, a lever carrying said idler-pulley, a screw for operating said lever for producing pressure of said idler-pulley on the belt for varying the tension of the latter, and means for deriving motion from said horizontal shaft for operating said screw, substantially as herein described.

10. The combination with a flier open at one end and bearings therefor, of a bobbin, a spindle upon which the bobbin is capable of moving lengthwise into and out from the flier, an upright turn-table and bearings thereon for said spindle, a stationary column located at one side of the turn-table, and a rotatable horizontal spindle on said column for the reception of a bobbin from the spindle length on the turn-table, substantially as herein described.

11. The combination with a flier open at one end and bearings therefor, of a bobbin, a spindle composed of two separable lengths upon which the bobbin is capable of moving lengthwise into and out from the flier, a coupling between said lengths of spindle, an upright turn-table and bearings thereon for one of said spindle lengths, a stationary column located at one side of the turn-table, and a rotatable horizontal spindle on said column for the reception of a bobbin from the spindle length on the turn-table, substantially as herein described.

12. The combination with a flier open at one end and bearings therefor, of a bobbin, a spindle composed of two separable lengths upon which the bobbin is capable of moving lengthwise into and out from the flier, a coupling between said lengths of spindle, an upright turn-table and bearings thereon for one of said spindle lengths, a stationary column located at one side of the turn-table, a rotatable spindle on said column for the reception of a bobbin from the spindle length on the turn-table, and means for locking said turn-table with said spindle length in line either with the other spindle length or with the said rotatable spindle, substantially as herein described.

13. The combination with a flier and bobbin and means for driving the same for twisting a sliver into a roving and coiling the twisted roving, of pin-carrying chains and a shaft upon which said chains run and through which they are driven, two spur-gears loose on said shaft, two driving-shafts, gearing between one of said two shafts and one of said loose gears and between the other of said two shafts and the other of said loose gears, a pulley fast on one of said shafts and a driving-belt for constantly driving said pulley and shaft at a certain speed, a loose pulley on the other of said shafts for driving it at a faster speed, a clutch on said shaft, a nipper between the pin-carrying chain and the flier, and means under the control of said nipper for actuating said clutch to couple and uncouple said loose pulley with and from its shaft, substantially as herein described.

14. The combination with a flier and bobbin and means for driving the same for twisting a sliver into a roving and coiling the twisted roving, of pin-carrying chains and a shaft upon which said chains run and through which they are driven, two spur-gears loose on said shaft, two driving-shafts, gearing between one of said two shafts and one of said loose gears and between the other of said two shafts and the other of said loose gears, a pulley fast on one of said shafts and a driving-belt for constantly driving said pulley and shaft at a certain speed, a loose pulley on the other of said shafts for driving it at a faster speed, a clutch on said shaft, a brake applied to said shaft, a nipper between the pin-carrying chains and the flier and means under the control of said nipper for actuating said clutch to couple and uncouple said loose pulley with and from its shaft and for applying and liberating said brake, all substantially as herein described.

In testimony that I claim the foregoing as my invention I have signed my name, in presence of two witnesses, this 25th day of February, 1903.

JOHN GOOD.

Witnesses:
FREDK. HAYNES,
HENRY THIEME.